US005328100A

United States Patent [19]

Bergstrom et al.

[11] Patent Number: 5,328,100

[45] Date of Patent: * Jul. 12, 1994

[54] MODIFIED ARMATURE FOR LOW NOISE INJECTOR

[75] Inventors: John S. Bergstrom, Williamsburg; Russell J. Wakeman, Newport News, both of Va.

[73] Assignee: Siemens Automotive L.P., Auburn Hills, Mich.

[*] Notice: The portion of the term of this patent subsequent to May 4, 2010 has been disclaimed.

[21] Appl. No.: 949,173

[22] Filed: Sep. 22, 1992

[51] Int. Cl.[5] .............................................. F16K 31/06

[52] U.S. Cl. ............................. 239/585.4; 251/129.21

[58] Field of Search ............... 239/585.1, 585.2, 585.3, 239/585.4, 585.5, 585.6; 251/129.21, 129.22; 335/277, 247, 271

[56] References Cited

U.S. PATENT DOCUMENTS

| | | | |
|---|---|---|---|
| 1,226,748 | 5/1917 | Burnham | 335/247 |
| 4,317,542 | 3/1982 | Morishita et al. | 239/585.5 |
| 4,531,708 | 7/1985 | Livet | 251/129.21 |
| 4,610,080 | 9/1986 | Hensley | 239/585.4 |
| 4,766,405 | 8/1988 | Daly et al. | 335/277 |
| 4,907,745 | 3/1990 | Messingschlager | 239/585.5 |
| 5,005,803 | 4/1991 | Fritz et al. | 251/129.21 |
| 5,207,387 | 5/1993 | Bergstrom | 239/585.4 |

*Primary Examiner*—Andres Kashnikow

*Assistant Examiner*—Christopher G. Trainor

*Attorney, Agent, or Firm*—George L. Boller; Russel C. Wells

[57] ABSTRACT

Audible noise emission from a solenoid-operated fuel injector is reduced by providing a groove around the armature spaced from the end of the armature that impacts the end to the pole piece/fuel inlet tube so as to leave a radial flange at the end of the armature. In one form of the invention, the groove extends around the outside diameter of the armature. In another form, the groove extends around the inside diameter of the armature. The groove is located and sized to optimize energy absorption during impact of the armature against the pole fuel inlet tube piece.

4 Claims, 1 Drawing Sheet

MODIFIED ARMATURE FOR LOW NOISE INJECTOR

FIELD OF THE INVENTION

This invention relates generally to electrically operated valves, such as fuel injectors for injecting liquid fuel into an internal combustion engine, and particularly to an armature for reducing certain audible operating noise from such a valve.

BACKGROUND OF THE INVENTION

Typically, a solenoid valve comprises an armature movable between a first and second position. The extremes of these first and second positions are often defined by mechanical stops. Armatures can be moved in one direction by an electro-magnetic force generated by a coil of wire and moved in the opposite direction by a return spring. When the armature impacts a stop, it bounces. Each bounce of the armature, or valving element, meters a small uncontrolled amount of fuel into the engine, to the detriment of emissions. As can be appreciated, the leakage of fuel into the engine will result in very unfavorable fuel economy. Furthermore, the bounce of the armature affects the operation of a fuel injector by prolonging or shortening the duration of injection, causing excessive wear in the valve seat area.

The armature is typically a solid structure with "fuel holes" that allow fuel to pass through to the valve and orifice. The energy from the impact of the armature against the pole piece causes resonances in the parts and assemblies of the injector, such as the housing, housing-inlet connector, connector, and armature needle.

Certain fuel-injected automobile engines operate sufficiently quietly that certain audible noise from the operating fuel injectors may be distinguished by some persons in the vicinity. The detection of such noise may be deemed objectionable by the manufacturer, and/or it may be mistakenly perceived by the customer as a defect in the product, despite the fact that it is operating properly.

It is seen then that it would be desirable to have operating fuel injectors which achieve a meaningful noise reduction in an effective manner, without requiring major revisions to component parts of existing fuel injectors.

SUMMARY OF THE INVENTION

This need is met by the system and method according to the present invention, wherein the structure of the armature is modified, reducing the noise from operating fuel injectors. Analysis of an operating fuel injector before the present invention has revealed certain noise in the range of about 4 kHz to about 10 kHz. The application of the present invention to that fuel injector has significantly attenuated that noise with the result that the measured A-weighted noise level has been reduced from about 60 dB to below 55 dB.

Briefly, the invention comprises the implementation of certain constructional features into the fuel injector in the armature region. Principles of the invention are of course potentially applicable to forms of fuel injectors other than the one specifically herein illustrated and described.

In accordance with one embodiment of the present invention, the armature is modified by putting a deep, narrow groove around the outside diameter of the armature leaving a radial flange at the armature's end. The groove is located and sized to optimize energy absorption during impact of the armature end against the pole piece.

In accordance with a second aspect of the present invention, the groove is located on the inside diameter of the barrel of the armature. This arrangement provides dampening by creating fluid turbulence.

For a full understanding of the nature and objects of the present invention, reference may be had to the following detailed description taken in conjunction with the accompanying drawings and the appended claims.

DESCRIPTION OF THE PREFERRED EMBODIMENT

Figure 1:
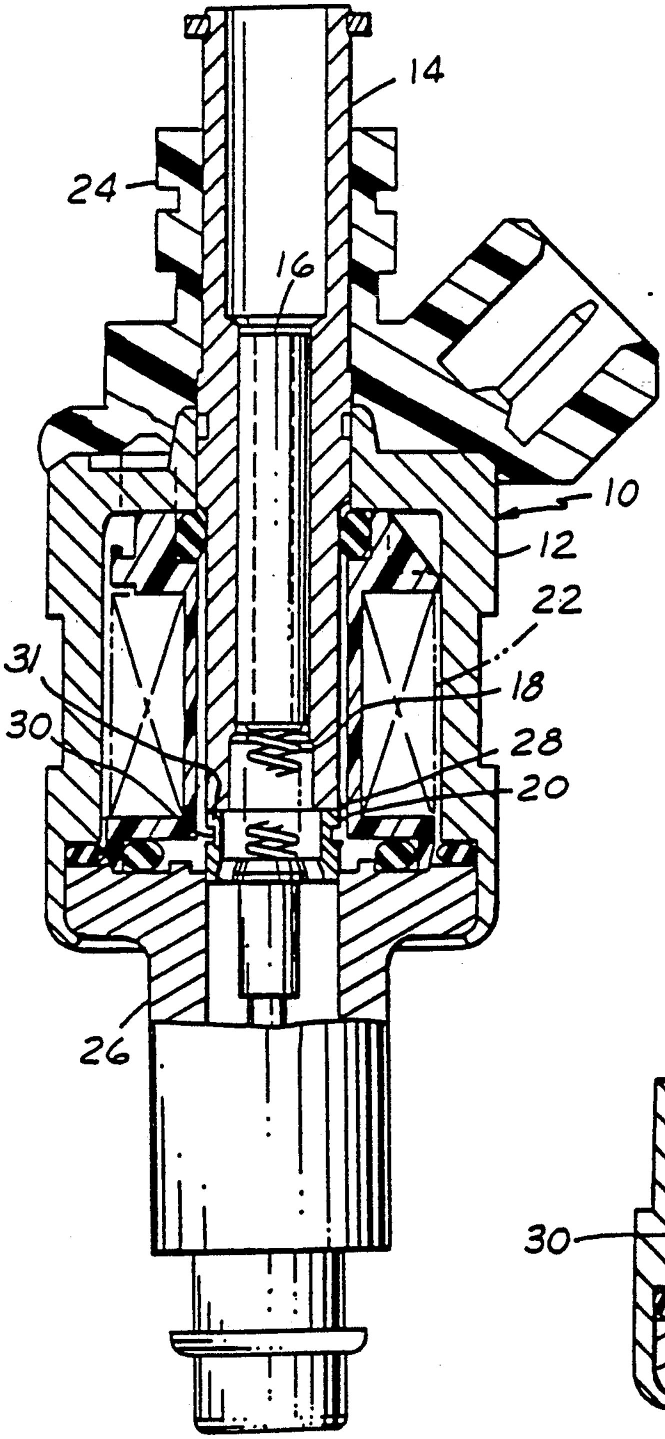
FIG. 1 is an elevational view, partly in cross section, through a fuel injector embodying one form of the present invention.

Referring to FIG. 1 there is illustrated partly in cross section, a typical fuel injector 10 designed to inject fuel into an internal combustion engine. The injector 10 includes a housing 12 of magnetically permeable material; an inlet connector 14 in the form of a tube also of magnetically permeable material; an adjusting tube 16; a helical coil spring 18; an armature 20; a solenoid coil assembly 22, including electrical terminals extending therefrom via which the fuel injector is connected with an electrical operating circuit for selectively energizing the solenoid coil; a non-metallic end cap 24; and a valve body assembly 26.

The relative organization and arrangement of these various parts are essentially the same as in the fuel injector of commonly assigned U.S. Pat. No. 4,610,080. The injector is of the type which is commonly referred to as a top-feed type, wherein fuel is introduced through inlet connector 14 and emitted as injections from the axially opposite nozzle, or tip, end.

The differences essentially relate to the inventive features of the present disclosure. Inlet connector tube 14 is disposed within solenoid coil assembly 22, and in addition to conveying pressurized liquid fuel into the interior of the fuel injector, it functions as a stator of the magnetic circuit that operates armature 20. The lower end of tube 14 and the upper end of armature 20 cooperatively define a working gap 28. Because the axial dimension of the working gap is small, it appears in the drawing Fig. simply as a line thickness. When the solenoid coil assembly is not energized, spring 18 pushes armature 20 away from tube 14 to cause valve body assembly 26 to be operated closed and thereby stop injection of liquid fuel from the fuel injector. When the solenoid coil assembly is energized, it pulls armature 20 toward tube 14 to cause valve body assembly 26 to be operated open and thereby inject liquid fuel from the fuel injector. The motion of armature 20 toward tube 14 is arrested by their mutual end-to-end abutment. This abutment creates impact forces which can give rise to the emission of audible noise from the fuel injector.

Such noise is successfully attenuated by the inclusion of a deep, narrow groove 30 extending completely around the outside diameter of the armature 20 leaving a radial flange 31 at the end. The groove 30 is located and sized to optimize energy absorption during impact of the armature 20 against the tube 14. By way of example in an injector of the type disclosed herein, such a groove has an axial dimension of about 1.00 mm and a radial dimension of about 1.25 mm. Of course, depending on what frequencies are creating noise problems, the dimensions and the location of the groove can be adjusted to optimize the noise attenuation.

Figure 2:
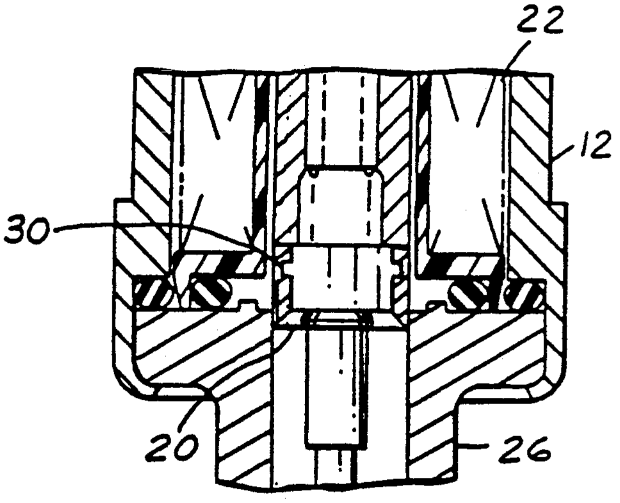
FIG. 2 is a fragmentary view of the armature of FIG. 1, illustrating a modified form of the invention.

Referring now to FIG. 2, a modified form of the armature 20 is illustrated, in which the groove 30 is located on the inside diameter of the barrel of the armature 20. This arrangement provides some dampening by creating fluid turbulence.

Having described the invention in detail and by reference to the preferred embodiments thereof, it will be apparent that principles of the invention are susceptible to being implemented in other forms of solenoid-operated valves without departing from the scope of the invention defined in the appended claims.

What is claimed is:

1. A solenoid-operated fuel injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected from said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path, characterized in that: impact-attenuating means are provided to attenuate the effect of such impact forces, and said impact-attenuating means comprises on said armature a circumferential groove that attenuates the effect of such impact forces in comparison to the effect of such impact forces in the absence of said groove; and said circumferential groove extends around an outside diameter of said armature spaced from said end of said armature leaving a radial flange at said end of said armature.

2. A solenoid-operated fuel injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected from said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path, characterized in that: impact-attenuating means are provided to attenuate the effect of such impact forces, and said impact-attenuating means comprises on said armature a circumferential groove that attenuates the effect of such impact forces in comparison to the effect of such impact forces in the absence of said groove; and said circumferential groove extends around an inside diameter of said armature spaced from said one end of said armature leaving a radial flange at said end of said armature.

3. A method for attenuating noise in a solenoid-operated fuel injector, the injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected form said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path, characterized by the step of; providing impact-attenuating means to attenuate the effect of such impact forces, said impact-attenuating means comprises on said armature a circumferential groove that attenuates the effect of such impact forces in comparison to the effect of such impact forces in the absence of said groove; and said circumferential groove extends around an outside diameter of said armature spaced from said end of said armature leaving a radial flange at said end of said armature.

4. A method for attenuating noise in a solenoid-operated fuel injector, the injector comprising a housing forming an enclosure which contains a solenoid coil that is selectively energized by electric current to operate the fuel injector, an inlet connector tube that extends into said solenoid coil to convey liquid fuel into said enclosure, an outlet via which fuel is injected from said enclosure, a valve mechanism that is disposed within said enclosure between said inlet connector tube and said outlet and that is operated by said solenoid coil acting through a spring-biased armature to open and close a flow path through said enclosure between said inlet connector tube and said outlet, said inlet connector tube forming a portion of a magnetic circuit path that directs magnetic flux across a working gap that is disposed within said enclosure between an end of said inlet connector tube and an end of said armature wherein said end of said armature causes impact forces to be exerted axially on said inlet connector tube end during the opening and closing of said flow path, characterized by the step of: providing impact-attenuating means to attenuate the effect of such impact forces, said impact-attenuating means comprises on said armature a circumferential groove that attenuates the effect of such impact forces in comparison to the effect of such impact forces in the absence of said groove; and said circumferential groove extends around an inside diameter of said armature spaced from said end of said armature leaving a radial flange at said end of said armature.

* * * * *